United States Patent [19]

Meador

[11] Patent Number: 5,637,936

[45] Date of Patent: Jun. 10, 1997

[54] ELECTROMAGNETICALLY POWERED ENGINE

[76] Inventor: Anthony L. Meador, 2305 Blackiston Mill Rd., Clarksville, Ind. 47129

[21] Appl. No.: 450,542

[22] Filed: May 25, 1995

[51] Int. Cl.$^6$ ................................................ H02K 33/00
[52] U.S. Cl. ................................................ 310/24; 310/23
[58] Field of Search ................................ 310/15, 17, 23, 310/22, 30, 24

[56] References Cited

U.S. PATENT DOCUMENTS

| | | | |
|---|---|---|---|
| 3,939,367 | 2/1976 | Ramirez | 310/20 |
| 4,473,763 | 9/1984 | McFarland | 310/24 |
| 5,036,930 | 8/1991 | Bisel et al. | 310/15 X |
| 5,057,724 | 10/1991 | Patton | 310/17 |
| 5,096,267 | 3/1992 | Volz | 303/113 TB |
| 5,179,304 | 1/1993 | Kenjo et al. | 310/12 |
| 5,203,172 | 4/1993 | Simpson et al. | 60/545 |
| 5,219,034 | 6/1993 | Wortham | 180/65.3 |

*Primary Examiner*—Steven L. Stephan
*Assistant Examiner*—Judson H. Jones
*Attorney, Agent, or Firm*—Kevin A. Sembrat; David L. Volk

[57] ABSTRACT

An electromagnetically powered engine apparatus and method converts pulsed alternating electrical and electromagnetic energy into mechanical energy which drives an output drive shaft. The engine apparatus produces usable mechanical power by pumping action made possible by dual opposing magnetic pistons disposed within a single cylinder on opposing sides of core member end of an electromagnet, which core member end is centrally situated within the cylinder. The dual opposing magnetic pistons are mechanically coupled to dual axles in a manner to rotate the dual axles each in a first direction. A drive chain interconnected with the dual axles and the output drive shaft effects rotation of the output drive shaft in the same first direction that the dual axles are rotated.

5 Claims, 3 Drawing Sheets

ELECTROMAGNETICALLY POWERED ENGINE

BACKGROUND OF THE INVENTION

1. Field of the Invention

The present invention relates generally to electromagnetically powered engines and, more particularly, to an electromagnetically powered engine apparatus which operates a plurality of magnetic pistons disposed within a single cylinder, with a single electromagnet having a core, which electromagnet receives an alternating directional flow of electrical current, thereby to alternate the magnetic polarity of the core for the purpose of driving a drive shaft with the plurality of magnetic pistons, which pistons are alternately magnetically attracted to and repelled from the magnetic core.

2. Description of the Related Art

Electromagnetically powered engine apparatus and methods which convert pulsed electromagnetic energy into mechanical and kinetic energy are well-known in the art. The electromagnetically powered engine is characterized by an engine housing or block fitted with a crankshaft, cylinders for receiving magnetic pistons conventionally attached to the crankshaft, and electromagnets mounted in the engine head for magnetically attracting and repelling the magnetic pistons in the cylinders in a selected sequence, thereby driving the crankshaft. These engines generally drive the magnetic piston in a cylinder by alternating a direction of the electrical current flowing through an electromagnetic coil, thereby to alternate the north and south polarity of a magnetic core, which is then utilized to alternately attract and repel the magnetic piston in the cylinder.

One example of a vehicle powered by a magnetic engine is taught by U.S. Pat. No. 5,219,034, issued in the name of Wortham, which is hereby incorporated herein by reference in its entirety. In the Wortham reference, a block is fitted with multiple cylinders for receiving magnetic pistons attached to a crankshaft and electromagnets mounted in the engine head for magnetically operating the magnetic pistons by electric current reversal. However, in the Wortham reference, each magnetic piston is operated by a separate electromagnet. Further, U.S. Pat. No. 5,203,172, issued in the name of Simpson et al., discloses an electromagnetically powered hydraulic engine apparatus that produces usable mechanical power by combining electromagnetic devices and hydraulic devices to create a pumping action from a reciprocating magnetic piston in a cylinder acting on a fluid that is responsive to pulsed electromagnetic energy. However, the Simpson et al. reference utilizes dual electromagnets positioned at opposing ends of the cylinder in which a permanent magnet piston is alternately attracted to and repelled by each pulsed electromagnet. The use of one or more electromagnets to operate a single magnetic piston increases the manufacturing costs of the engine and has timing consideration problems that are not incurred by an engine which operates a plurality of magnetic pistons with a single electromagnet.

Consequently, a need has been felt for providing an electromagnetically powered engine apparatus which operates a plurality of magnetic pistons with a single electromagnet having a core, which electromagnet receives pulsed electrical current thereby to alternate the magnetic polarity of the core, thereby to overcome the manufacturing cost and timing considerations that are associated with electromagnetically powered engines which operate a single magnetic piston with one or more electromagnets.

SUMMARY OF THE INVENTION

It is therefore an object of the present invention to provide an improved electromagnetically powered engine apparatus which operates a plurality of magnetic pistons with a single electromagnet having a core, which electromagnet receives an alternating directional flow of electrical current, thereby to alternate the magnetic polarity of the core for the purpose of driving a drive shaft with the plurality of magnetic pistons, which pistons are alternately magnetically attracted to and repelled from the magnetic core.

Briefly described according to one embodiment of the present invention, an electromagnetically powered engine apparatus and method converts pulsed alternating electrical and electromagnetic energy into mechanical energy which drives an output drive shaft. The engine apparatus produces usable mechanical power by pumping action made possible by dual opposing magnetic pistons disposed within a single cylinder on opposing sides of core member end of an electromagnet, which core member end is centrally situated within the cylinder. The dual opposing magnetic pistons are mechanically coupled to dual axles in a manner to rotate the dual axles each in a first direction. A drive chain interconnected with the dual axles and the output drive shaft effects rotation of the output drive shaft in the same first direction that the dual axles are rotated.

A preferred embodiment of the present invention provides an electromagnetically powered engine apparatus comprising: an electrical energy source means for powering the apparatus; a mechanical motor apparatus having an output drive shaft to effect conversion of electrical energy from the electrical energy source to work; at least one electromagnet means electrically coupled and responsive to the energy source means for producing controlled magnetic fields, the electromagnet means comprising a coil member and a fixedly and centrally located magnetic core member with respect to the coil member; a first cylinder having a central orifice through which a portion of said core member is inserted; a plurality of piston-permanent magnet means disposed within the first cylinder on opposing sides of the core member in a magnetically coupling relationship with the core member, thereby to be magnetically attracted toward the core member within the first cylinder during a first polarity state occurring from a synchronous energizing and de-energizing of the core member from the energy source means, and thereby to be magnetically repelled away from the core member within the first cylinder during a second polarity state occurring from the synchronous energizing and de-energizing of the core member from the energy source means; and connection means for connecting each of the piston-permanent magnet means to the output drive shaft, thereby to drive the drive shaft when the plurality of piston-permanent magnet means is magnetically urged, within the first cylinder, alternately toward and away from the core member.

An advantage of the present invention is that cost-effective mechanical power is produced from electrical and electromagnetic energy.

Another advantage of the present invention is that increased drive power is achievable by driving a plurality of magnetic pistons with a single electromagnet.

Another advantage of the present invention is that environmental pollution is minimized.

Another advantage of the present invention is that compression within the cylinders is not necessary to operate the present invention, thereby increasing the operating life of the cylinders and pistons.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
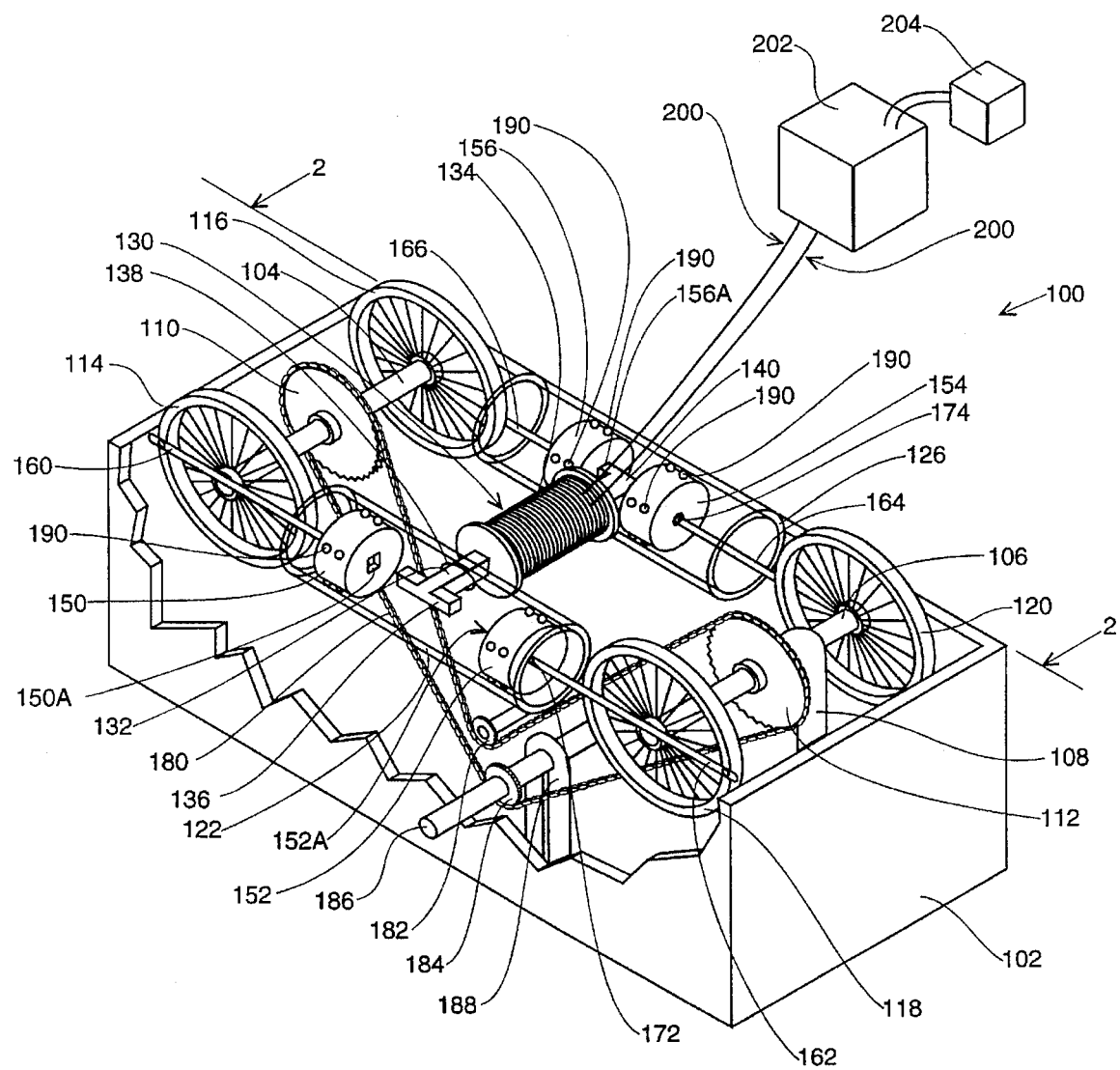
FIG. 1 is a perspective view of an electromagnetically powered engine according to a preferred embodiment of the present invention, with a frame shown partially broken away to disclose internal components of the engine, and with two cylinders shown as transparent for purposes of illustrating the positioning of the plurality of magnetic pistons, which pistons are operated by a single electromagnetic core within each cylinder.
Figure 2:
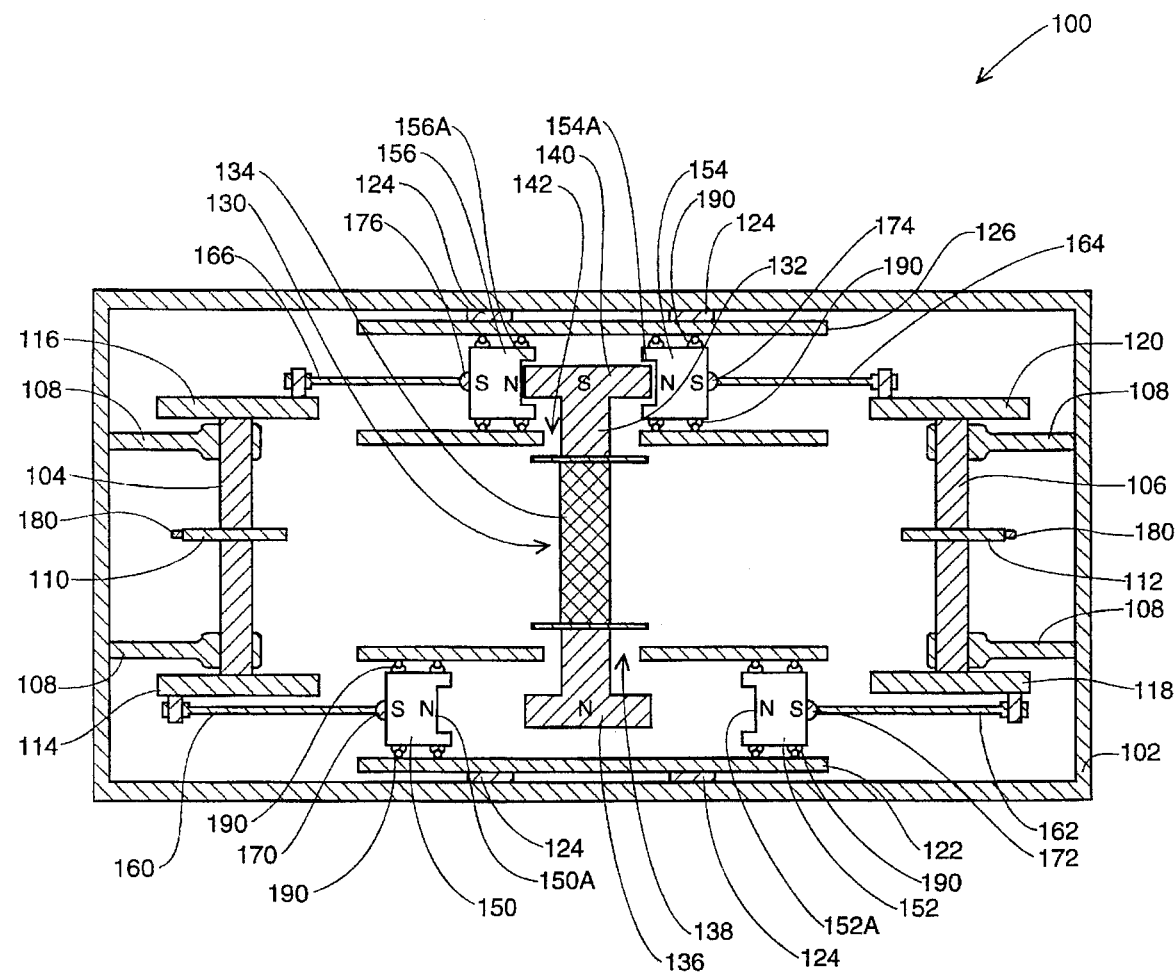
FIG. 2 is an top plan cross-sectional view of the electromagnetically powered engine, taken along the lines 2—2 of FIG. 1.
Figure 3:
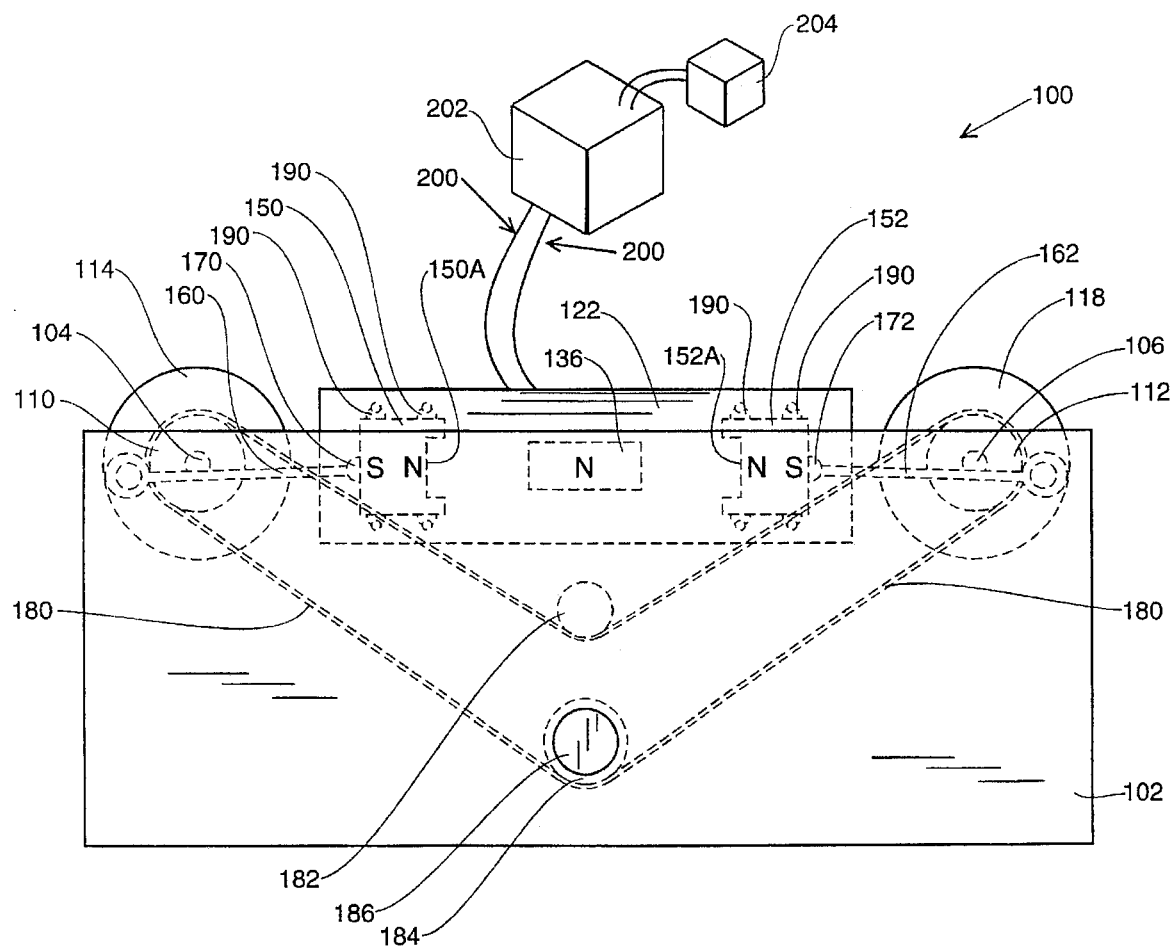
FIG. 3 is a side elevational view of the electromagnetically powered engine according to a preferred embodiment of the present invention, showing elements hidden by the external housing in phantom broken lines.

Referring to FIGS. 1–3, an electromagnetically powered engine apparatus 100 is shown, according to the present invention, having a frame 102, which frame 102 is illustrated with no specific structural configuration, the structural components being conventional in design. Axles 104 and 106 are rotatably mounted with axle mounting brackets 108 within the frame 102 at opposing sides. A chain drive gear 110, 112 is fixedly mounted to a central portion of the axles 104, 106, respectively, thereby to rotate when the axle 104, 106 rotates. A first flywheel 114 and a second flywheel 116 is fixedly mounted to opposing ends of the axle 104, thereby to rotate when the axle 104 and the chain drive gear 110 rotates. Similarly, a third flywheel 118 and a fourth flywheel 120 is fixedly mounted to opposing ends of the axle 106, thereby to rotate when the axle 106 and the chain drive gear 112 rotates.

A first cylinder 122 is fixedly mounted between the first flywheel 114 and the third flywheel 118 with cylinder mounting brackets 124 (see FIG. 2) within the frame 102. Similarly, a second cylinder 126 is fixedly mounted between the second flywheel 116 and the fourth flywheel 120 with the cylinder mounting brackets 124 within the frame 102. Electromagnetic means 130, comprising a stationary, centrally disposed core member 132 and a coil member 134 is centrally disposed perpendicularly between each of the first cylinder 122 and the second cylinder 126, with a first core end 136 inserted into the first cylinder 122 through a first central orifice 138, and with a second core end 140 inserted into the second cylinder 126 through a second central orifice 142 (see FIG. 2). As shown, a preferred embodiment of the first core end 136 is T-shaped, which is intended to be received by respective cavities 150a and 152a of single piston-permanent magnet means 150 and 152 disposed in either side of the first cylinder 122. Similarly, a preferred embodiment of the second core end 140 is T-shaped, which is intended to be received by respective cavities 154a and 156a of single piston-permanent magnet means 154 and 156 disposed in either side of the second cylinder 126. The cavities and the T-shaped first and second core ends are intended to increase the magnetic pull on the magnetic piston means 150, 152, 154, 156 by electromagnetic means 130, thereby generating higher power output, as described below and as similarly taught by the Simpson et al. reference.

A connecting rod 160, 162, 164, 166 is connected to the magnetic piston means 150, 152, 154, 156, respectively, preferably with a ball joint 170, 172, 174, 176 to facilitate movement of the connecting rod 160, 162, 164, 166 in multiple degrees. The opposite end of the connecting rods 160, 162, 164, 166 are rotatably connected in a conventional fashion to the first flywheel 114, the second flywheel 116, the third flywheel 118, and the fourth flywheel 120, respectively, thereby to urge the flywheels, and therefore the axles 104, 106 into rotation in a first direction as the magnetic pistons means are driven by synchronous energizing and de-energizing of the core member within the first cylinder 122 and the second cylinder 126, as further described below.

A drive chain 180 is interconnected with the chain drive gears 110, 112, a direction-change gear 182 for changing the direction of the drive chain, and a drive shaft gear 184. The drive shaft gear 184 is fixedly mounted to a drive shaft 186, thereby to rotate the drive shaft when the drive shaft gear rotates, for mechanical energy output. The drive shaft 186 is rotatably mounted with drive shaft mounting means 188 within the frame 102.

A preferred embodiment of the magnetic piston means 150, 152, 154, 156 slides within the first and second cylinders 122, 126 on a plurality of roller bearing mountings 190, which mountings are intended to minimize the loss of energy due to friction between the cylinders and the magnetic piston means. Another embodiment is to facilitate "floating" of the magnetic piston means 150, 152, 154, 156 in magnetic flux generated by disposing the pistons in magnetic cylinders and shield the attractive magnetic pole of each piston, similar to that taught by the Wortham reference.

Electromagnetic wiring 200 extends from the electromagnetic means 130 to a conventional polarity timing device 202 and associated conventional electric power supply 204, similar to that taught by the Wortham reference. The conventional polarity timing device 202 is designed to reverse the flow of electrical current through the windings of the coil member 134 in the electromagnetic means 130, in order to orchestrate the attraction and repulsion of the respective magnetic piston means 150, 152, 154, 156 with the single electromagnetic means 130, and to operate the drive shaft 186 in a smooth continuous manner, similar to the function of a conventional internal combustion engine, but with multiple pistons positioned within each of the single cylinders 122 and 126 being driven to rotate the flywheels and the attached drive chain 180, which is connected to the drive shaft 186.

2. Operation of the Preferred Embodiment

In operation, and referring again to the drawings, the electromagnetically powered engine apparatus 100 is operated by initially energizing the coil member 134, using a conventional key and switch (not illustrated), thereby to complete electrical circuitry through the electromagnetic wiring 200 and the conventional polarity timing device 202 and the associated conventional power supply 204, in order to generate an electric field about the coil member in a conventional manner to magnetically polarize the core member 132. Electrical resistance in the conventional polarity timing device 202 is varied as taught in the Wortham reference, thereby to vary the strength of the magnetic field which polarizes the core member 132. The conventional polarity timing device 202 alternates the direction of current flow through the wiring 200, thereby to alternately energize electromagnetic means 130 to polarize the first core end 136 to a north (N) polarity while the second core end 140 is polarized to a south (S) polarity, and vice versa.

As shown in FIG. 2, when the first core end 136 is polarized to a north (N) polarity and the second core end 140 is polarized to a south (S) polarity, the adjacent north (N) pole of single piston-permanent magnet means 150 is magnetically repelled away from the north (N) polarity of the first core end 136 and toward the first flywheel 114, thereby rotating the axle 104 by rotating the first flywheel 114 with the connecting rod 160, while at the same time the adjacent north (N) pole of single piston-permanent magnet means 156 is magnetically attracted toward the south (S) polarity of the second core end 140 and away from the second flywheel 116, thereby also rotating the axle 104 by rotating the first flywheel 114 with the connecting rod 166, in cooperative unison with the rotation of the first flywheel 114.

Similarly and simultaneously, the adjacent north (N) pole of single piston-permanent magnet means 152 is also magnetically repelled away from the north (N) polarity of the first core end 136 and toward the third flywheel 118, thereby rotating the axle 106 by rotating the third flywheel 118 with the connecting rod 162, while at the same time the adjacent north (N) pole of single piston-permanent magnet means 154 is magnetically attracted toward the south (S) polarity of the second core end 140 and away from the fourth flywheel 120, thereby also rotating the axle 106 by rotating the fourth flywheel 120 with the connecting rod 164, in cooperative unison with the rotation of the third flywheel 118.

Similarly, when the direction of current flow through the coil member 134 is reversed, the polarity of the first core end 136 and the second core end 138 is reversed, thereby attracting those single piston permanent magnet means which were previously repelled, and repelling those single piston permanent magnet means which were previously attracted, and providing another cycled turn of the flywheels and respectively attached axles 104 and 106.

For the purposes of illustration, FIGS. 1, 2, and 3 show two pistons surrounding each of the first core end 136 and the second core end 140, thereby driving each of the axles 104 and 106 with two pistons each. However, other preferred embodiments of the present invention contemplate additional pistons strategically located around each of the first core end 136 and the second core end 140, such as with additional cylinders which centrally intersect with the cylinders 122 and 126 at each of the core ends 136 and 140, thereby to increase the drive force provided to the axles 104 and 106, as well as to separately attached axles.

The drive chain is interconnected with the rotating axles 104 and 106, thereby to rotate the interconnected drive shaft gear 184 and the attached drive shaft 186, thereby to convert the electrical energy provided from the power supply 204 into electromagnetic energy at the electromagnetic means 130, and finally into mechanical energy at the drive shaft 186.

Thus, there has been shown and described an electromagnetically powered engine apparatus which operates a plurality of magnetic pistons disposed within a single cylinder, with a single electromagnet having a core, which electromagnet receives an alternating directional flow of electrical current, thereby to alternate the magnetic polarity of the core, for the purpose of driving a drive shaft with the plurality of magnetic pistons, which pistons are alternately magnetically attracted to and repelled from the magnetic core, which apparatus fulfills all the objects and advantages sought therefore. Many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. An electromagnetically powered engine apparatus comprising:

a frame member;

a first and second axle rotatably mounted within said frame member;

a drive shaft rotatably mounted within said frame member;

drive chain means for interconnectively coupling said first axle, said second axle and said drive shaft, thereby rotate said drive shaft in a first direction when said first and second axle is rotated in said first direction;

an electrical energy source means for powering said apparatus;

electromagnet means electrically coupled and responsive to said energy source means for producing controlled magnetic fields, said electromagnet means comprising a coil member and a fixedly and centrally located magnetic core member with respect to said coil member, said core member having a first core end and a second core end, said electromagnet means fixedly attached to a central portion of said frame member;

a first cylinder having a first port, a second port and a first central orifice, said first cylinder being fixedly attached to said frame member in a position to receive said first core end through said first central orifice;

a second cylinder having a third port, a fourth port and a second central orifice, said second cylinder being fixedly attached to said frame member in a position to receive said second core end through said second central orifice;

first and second piston-permanent magnet means disposed within said first cylinder through said first and second port respectively, such that a similar magnetic pole of each of said first and second piston-permanent magnet means faces said first core end which separates said first and second piston-permanent magnet means, thereby to slidably urge said first and second piston-permanent magnet means toward and away from said first core end as the magnetic polarity of said first core end is alternately changed;

a third and fourth piston-permanent magnet means disposed within said second cylinder through said third and fourth port respectively, such that said similar magnetic pole which faces said first core end in said first cylinder similarly faces of each of said third and fourth piston-permanent magnet means faces said second core end which separates said third and fourth piston-permanent magnet means, thereby to slidably urge said third and fourth piston-permanent magnet means toward and away from said first core end as the magnetic polarity of said second core end is alternately changed;

first mechanical coupling means for coupling said first and third piston-permanent magnet means to said first axle, thereby to rotate said first axle in said first direction as said first and third piston-permanent magnet means is slidably urged in cooperative unison within said first and second cylinders, respectively; and second mechanical coupling means for coupling said second and fourth piston-permanent magnet means to said second axle, thereby to rotate said second axle in said first direction as said second and fourth piston-permanent magnet means is slidably urged in cooperative unison within said third and fourth cylinders, respectively.

2. An electromagnetically powered engine apparatus comprising:

an electrical energy source means for powering said apparatus;

a mechanical motor apparatus having an output drive shaft to effect conversion of electrical energy from said electrical energy source to work;

at least one electromagnet means electrically coupled and responsive to said energy source means for producing controlled magnetic fields, said electromagnet means comprising a coil member and a fixedly and centrally located magnetic core member with respect to said coil member;

a first cylinder having a central orifice through which a portion of said core member is inserted;

a plurality of piston-permanent magnet means disposed within said first cylinder on opposing sides of said core member in a magnetically coupling relationship with said core member, thereby to be magnetically attracted toward said core member within said first cylinder during a first polarity state occuring from a synchonous energizing and de-energizing of said core member from said energy source means, and thereby to be magnetically repelled away from said core member within said first cylinder during a second polarity state occuring from said synchonous energizing and de-energizing of said core member from said energy source means; and connection means for connecting each of said piston-permanent magnet means to said output drive shaft, thereby to drive said drive shaft when said plurality of piston-permanent magnet means is magnetically urged, within said first cylinder, alternately toward and away from said core member.

3. The electromagnetically powered engine apparatus according to claim 2, wherein said cylinder further comprises a second cylinder which centrally intersects with said cylinder at said central orifice through which a portion of said core member is inserted.

4. The electromagnetically powered engine apparatus according to claim 3, wherein said second cylinder receives said plurality of piston-permanent magnet means which are cooperatively interconnected to drive said drive shaft.

5. A method of driving a drive shaft using electromagnetic energy, said method comprising the steps of:

(a) providing an electromagnetically powered engine apparatus comprising:

an electrical energy source means for powering said apparatus;

a mechanical motor apparatus having an output drive shaft to effect conversion of electrical energy from said electrical energy source to work;

at least one electromagnet means electrically coupled and responsive to said energy source means for producing controlled magnetic fields, said electromagnet means comprising a coil member and a fixedly and centrally located magnetic core member with respect to said coil member;

a plurality of piston-permanent magnet means disposed within a cylinder on opposing sides of said core member in a magnetically coupling relationship with said core member, thereby to be magnetically attracted toward said core member within said cylinder during a first polarity state occuring from a synchonous energizing and de-energizing of said core member from said energy source means, and thereby to be magnetically repelled away from said core member within said cylinder during a second polarity state occuring from said synchonous energizing and de-energizing of said core member from said energy source means;

connection means for connecting each of said piston-permanent magnet means to said output drive shaft, thereby to drive said drive shaft when said plurality of piston-permanent magnet means is magnetically urged within said cylinder, alternately toward and away from said core member;

(b) synchronously energizing and de-energizing said coil member from said energy source means and producing power states that result in producing alternating polarity magnetic fields;

(c) repelling said piston-permanent magnet means during a first polarity state, thereby effecting a first cycle of rotating said drive shaft in a first direction;

(d) attracting said piston-permanent magnet means to said core member during a second polarity state, thereby effecting a final cycle of rotating said drive shaft in said first direction; and (e) repeating said steps (c) and (d) and producing cooperative interaction of said plurality of piston-permanent magnet means, thereby to continuously rotate said drive shaft in said first direction.

* * * * *